Patented Nov. 11, 1947

2,430,467

UNITED STATES PATENT OFFICE 2,430,467

3-AMINO-DERIVATIVES OF STEROIDS AND METHOD OF MAKING SAME

Percy L. Julian, Maywood, John W. Cole, Chicago, Arthur Magnani, Wilmette, and Edwin W. Meyer, Chicago, Ill., assignors to The Glidden Company, Cleveland, Ohio, a corporation of Ohio No Drawing. Application February 11, 1944, Serial No. 522,030

14 Claims. (Cl. 260—397)

The present invention relates to 3-amino-etiocholenyl ethylenes which are valuable intermediates in the synthesis of compounds having physiological activity.

We have found that the introduction of amino groups of basic character into the 3-position of $\Delta^5$-unsaturated steroids facilitates the separation of said steroids, via their insoluble salts, from impurities, at the same time leaving in the 3-position groups which can be readily converted in good yield into a ketone group without employing the cumbersome traditional method of halogenation and dehalogenation. Since many hormones contain a 3-keto group, these 3-amino derivatives are valuable intermediates in the preparation of compounds exhibiting hormone activity.

It is accordingly an object of the present invention to prepare 3-amino derivatives of steroids.

Another object is to prepare 3-amino-etiocholenyl ethylenes.

Another object is to provide new intermediates useful in the synthesis of hormones.

An additional object is to provide a method for making 3-amino-steroids.

The compounds of the present invention possess the general formula:

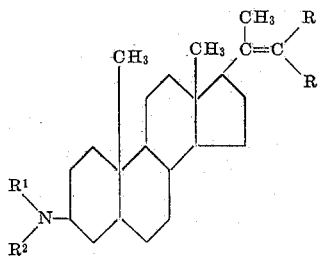

in which R may be hydrogen or a hydrocarbon residue and $R^1$ may be a hydrogen, aryl, alkyl, or an aralkyl group, and $R^2$ represents either hydrogen or an acyl group.

These compounds may be prepared by a number of different methods.

One method is to treat an etiocholenyl ethylene containing in the 3-position a group corresponding to the anion of strong acid with ammonia or an amine. Thus the anion group in the 3-position may be, for example, halogen or arylsulfonoxy.

Another method for preparing the 3-amino compounds involves the reduction of a 3-oximino-$\Delta^4$-etiocholenylethylene to yield a primary amine.

Primary amines formed by either of these methods may be alkylated, aralkylated or acylated at will.

The amines of the present invention are crystalline substances readily purified and form insoluble salts with mineral acids. By treatment of these amines with hypochlorous acid followed by removal of the elements of hydrogen chloride and hydrolysis, one obtains a ketone directly, or a primary amine which may be degraded to a ketone by a repetition of the hypochlorous acid treatment.

The following examples illustrate the invention:

EXAMPLE I

*Oxime of 1,1-diphenyl-2-methyl-2[3-keto-$\Delta^4$-etiocholenyl]-ethylene*

To 10 grams of the 1,1-diphenyl-2-methyl-2[3-keto-$\Delta^4$-etiocholenyl]-ethylene in 150 cc. ethyl alcohol was added a solution of 4.0 gms.

$NH_2OH \cdot HCl$ 6.0 gms. NaAc, 10 cc. water and 25 cc. ethyl alcohol and the mixture was heated on a steam cone for 15–20 minutes during which time the ketoethylene completely dissolved. The solution was refluxed for 2 hours and then poured into 250 cc. water. The flocculent white precipitate formed was filtered, washed well with water and dried. The yield of crude oxime melting at 147–152° C. was 10 grams. A sample recrystallized from dilute alcohol melted at 151–154° C.

In some instances an isomeric oxime was obtained which melted at 210–212° C. and which separated from the solution during refluxing. A mixed-melting point with the original ketoethylene melted at 190–195° C. Recrystallization from alcohol converted it into the lower melting isomer. Hydrolysis of a sample with dilute acid yielded the original ketoethylene.

EXAMPLE II

*Reduction of the oxime of 1,1-diphenyl-2-methyl-2[3-keto-$\Delta^4$-etiocholenyl]-ethylene to 1,1-diphenyl-2-methyl-2[3-amino-$\Delta^5$-etiocholenyl]-ethylene*

Over a 3 hour period 46 grams of sodium and 275 cc. ethyl alcohol were added in portions to the heated solution of 10 grams of the crude oxime of Example I in 250 cc. ethyl alcohol. After all of the sodium had dissolved the sodium ethoxide was cautiously decomposed with water and the solution poured into 500 cc. water containing 100 cc. conc. HCl. The oily precipitate was extracted with ether and the ethereal solution washed with water. The ether was removed and the residual oil dissolved in alcohol and 3 cc. benzaldehyde added. The alcohol solution was refluxed for ½ hour, concentrated and allowed to crystallize. The benzal derivative of the amine was filtered, washed with alcohol and dried. The yield of benzal derivative was 5.5 grams which melted at 200–210° C. A sample recrystallized from benzene-methanol melted at 225–235° C.

Five grams of the benzal derivative were dissolved in 50 cc. alcohol after adding 2 cc. conc. HCl and the solution steam distilled to remove the alcohol and benzaldehyde. The remaining suspension of amine hydrochloride was diluted with 400 cc. water and 25 cc. of 10% NaOH was added with vigorous shaking. The solid free amine formed as a white compound which was filtered, washed with water, and dried. The yield of crude amine was 4.2 grams melting at 122–125° C.

EXAMPLE III

*Reaction of 1,1-diphenyl-2-methyl-2[3-p-toluenesulfonoxy - $\Delta^5$ - etiocholenyl]-ethylene with ammonia*

10.0 g. of 1,1-diphenyl-2-methyl-2[3-p-toluenesulfonoxy-$\Delta^5$-etiocholenyl]-ethylene was covered with 23.3 g. of liquid ammonia, placed in a steel bomb, and the bomb closed. The bomb was heated in an oil bath at 85–95° C. for twenty hours. After cooling, the ammonia was vented and the product removed from the bomb with ether and water. The mixture was extracted with ether. The ether layer was shaken with dilute hydrochloric acid and then several times with water. The gelatinous precipitate which separated was collected and washed with ether. The precipitate was then decomposed with 10% sodium hydroxide solution and extracted with ether. The ether solution was washed free of alkali with water, dried and concentrated. There remained 3.0 g. of a yellow sirup. This material was taken up in methanol and treated with 2 cc. of benzaldehyde. There separated 2.5 g. of crude benzal derivative. Several recrystallizations from benzenemethanol gave a white, crystalline solid melting at 240–245°. This material showed no depression in melting point when mix melted with the benzal derivative of the amine prepared from the oxime as in Example II.

Decomposition of the benzal derivative as in Example II gave the desired 3-amino compound.

EXAMPLE IV

*Acetylation of 1,1-diphenyl-2-methyl-2[3-amino-$\Delta^5$-etiocholenyl]-ethylene*

3.8 grams of the benzal derivative of the amine of Example II was dissolved in 30 cc. ethyl alcohol containing 2 cc. conc. HCl and subjected to steam distillation to remove the alcohol and benzaldehyde. The remaining milky suspension was cooled, made alkaline with dilute NaOH solution, and the free amine extracted with ether. The ether solution was washed with water, dried and the ether removed. There remained 3.3 grams of a yellow oil. The oil was heated with 10 cc. acetic anhydride for one hour on the steam bath. Then 10 cc. methanol were added and heating continued for an additional half hour. After dilution with water, the acetylated product was extracted with ether and the ethereal solution washed successively with water, dilute NaOH, and water. After drying the ether solution was concentrated whereupon the 3-acetylamino derivative crystallized readily from the ether. There was obtained 1.8 grams melting at 145–147° C. Further concentration of the mother liquor gave an additional 0.6 gram melting at 132–139° C.

EXAMPLE V

*Preparation of 1,1-diphenyl-2-methyl-2[3-keto-$\Delta^4$-etiocholenyl]-ethylene*

To a solution of 0.8 gram of 1,1-diphenyl-2-methyl-2[3-amino-$\Delta^5$-etiocholenyl]-ethylene in 25 cc. ether at —10° C. was added an ethereal solution of hypochlorous acid containing 0.09 gram HOCl. The resulting ethereal solution was washed with 10 cc. cold 5% NaOH to remove any unreacted HOCl and then washed with water. A sample of the ether solution was added to acidified KI in aqueous alcohol solution and the liberated $I_2$ was titrated with standard thiosulfate solution. From the titration it was calculated that the amine had been converted into the chloramine to the extent of 92%.

The dried ethereal solution of the chloramine was added to a solution of 0.5 gram sodium in 30 cc. absolute alcohol. The ether was removed by distillation and the alcoholic solution heated at reflux for 15 minutes. The alcoholic solution was poured into 100 cc. water containing 5 cc. conc. $H_2SO_4$ and allowed to stand overnite. The yellowish precipitate was extracted with ether, the ether removed and the residue crystallized from acetone. There was obtained 0.3 gram of the 3-ketoethylene.

After the ether extraction there remained some solid which was ether insoluble. This proved to be some recovered amine which was isolated through its benzal derivative. Weight=0.35 gram.

EXAMPLE VI

*Preparation of 1,1-diphenyl-2-methyl-2[3-anilino - $\Delta^5$ - etiocholenyl] - ethylene from 1,1-diphenyl - 2 - methyl - 2[3 - p - toluenesulfonoxy-$\Delta^5$-etiocholenyl] ethylene*

A mixture of 6.0 grams of 1,1-diphenyl-2-methyl - 2[3 - p - toluenesulfonoxy - $\Delta^5$ - etiocholenyl]-ethylene and 10 cc. of aniline were refluxed for one hour. After addition of alkali, the excess aniline was removed by steam distillation and the residue was taken up in ether. The ether solution was washed with water and the ether removed by distillation. The residue was crystallized from ether-methanol whereupon 4.0 grams of the product melting at 195–197° C. were obtained. An additional 0.4 gram melting at 189–192° C. was obtained from the mother liquor by further concentration. The compound is sparingly soluble in methanol.

The foregoing examples are merely illustrative and various changes and modifications may be made therein by those skilled in the art without departing from the spirit and scope of the invention. For example, instead of employing the diphenyl ethylenes, ethylenes bearing other groups such as hydrogen or alkyl groups in the 22-position may be employed. Likewise other amino groups than those mentioned in the foregoing examples such as methylamino, benzylamino, etc., may be introduced into the 3-position. Moreover either primary or secondary amines may be acylated as in Example IV.

What we claim is:

1. Compounds of the general formula

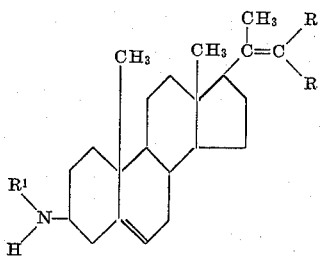

in which R represents a phenyl radical, and $R^1$ is selected from the class consisting of hydrogen, and aryl, alkyl, and aralkyl radicals.

2. 1,1 - diphenyl - 2 - methyl - 2[3 - amino - $\Delta^5$-etiocholenyl]-ethylene.

3. 1,1 - diphenyl - 2 - methyl - 2[3 - anilino - $\Delta^5$-etiocholenyl]-ethylene.

4. 1,1 - diphenyl - 2 - methyl - 2[3 - acetamino - $\Delta^5$-etiocholenyl]-ethylene.

5. In a process for preparing compounds of the general formula

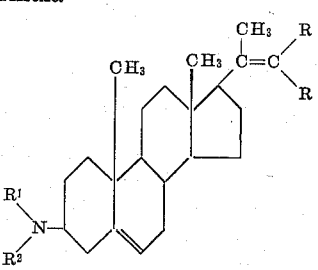

in which R is selected from the class consisting of hydrogen and hydrocarbon radicals, and $R^1$ is selected from the class consisting of hydrogen, and aryl, alkyl, aralkyl radicals and $R^2$ is selected from the class consisting of hydrogen and acyl radicals, the step which comprises treating a compound of the formula

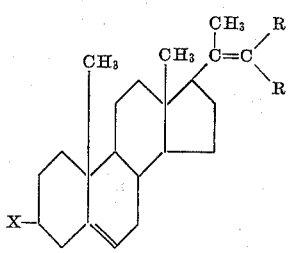

in which R is selected from the class consisting of hydrogen and hydrocarbon radicals and X is a group which corresponds to the anion of a strong acid with an amino compound selected from the class consisting of ammonia and primary amines.

6. The process of claim 5 in which R represents phenyl radicals.

7. The process of claim 5 in which $R^1$ represents hydrogen.

8. The process of claim 5 in which $R^1$ represents hydrogen and R a phenyl radical.

9. The process of claim 5 in which $R^1$ represents a phenyl radical.

10. The process of claim 5 in which R and $R^1$ represent phenyl radicals.

11. The process which comprises treating an amine of the general formula

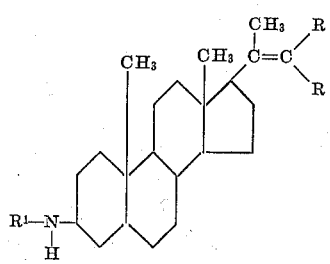

in which R is selected from the class consisting of hydrogen and hydrocarbon radicals, and $R^1$ is selected from the class consisting of hydrogen and aryl, alkyl and aralkyl radicals with an acylating agent.

12. The process which comprises treating a compound of the general formula

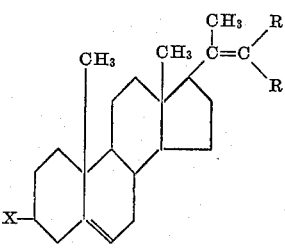

in which R is selected from the class consisting of hydrogen and hydrocarbon radicals and X is a group which corresponds to the anion of a strong acid with an amino compound selected from the class consisting of ammonia and primary amines and treating the resulting 3-amino steroid with an acylating agent.

13. A process of claim 12 in which R represents a phenyl radical and the amino compound is ammonia and the acylating agent is acetic anhydride.

14. The process of claim 5 in which $R^2$ is hydrogen.

PERCY L. JULIAN.
JOHN W. COLE.
ARTHUR MAGNANI.
EDWIN W. MEYER.